Jan. 13, 1959     E. W. SCHLIEBEN     2,868,476
CONVERTIPLANE WITH TILTABLE CYLINDRICAL WING
Filed June 25, 1956     3 Sheets-Sheet 1

INVENTOR.
Ernest W. Schlieben
BY
ATTORNEY

Jan. 13, 1959 E. W. SCHLIEBEN 2,868,476
CONVERTIPLANE WITH TILTABLE CYLINDRICAL WING
Filed June 25, 1956 3 Sheets-Sheet 3

INVENTOR.
Ernest W. Schlieben
BY
ATTORNEY

United States Patent Office 2,868,476
Patented Jan. 13, 1959

2,868,476

CONVERTIPLANE WITH TILTABLE CYLINDRICAL WING

Ernest W. Schlieben, Concord, Mass.

Application June 25, 1956, Serial No. 593,562

12 Claims. (Cl. 244—7)

A vertical riser type of aircraft construction forms the subject matter of the present invention. The term "convertiplane" is hereinafter employed throughout the specification to refer generally to an aircraft construction which includes a fuselage, a continuous lift wing member supported on the fuselage, and a plurality of thrust devices organized so as to provide a radically different form of aircraft propulsion in which the thrust devices not only constitute a means for producing propulsion but also cooperate to provide for movement of the lift wing member relative to the fuselage along a somewhat orbital path to accomplish unique directional control.

It is well known in the art to combine means for providing vertical take-off with additional means for accomplishing propulsion along any desired direction, and I am aware that such forms of aircraft have been proposed and referred to as convertiplanes. However, these earlier structures, while approaching in performance the helicopter on the one hand and the fixed wing type of aircraft on the other hand, cannot equal the performance of either helicopter or fixed wing type aircraft.

It is a general object of the invention to improve aircraft construction and propulsion and to provide a unique type of convertiplane which retains all of the desirable features of the helicopter as well as those of the fixed wing type of aircraft and thereby makes it possible to virtually equal the performance of both a helicopter and fixed wing type plane of the same relative weight and power. Another object is to devise a convertiplane structure of simplified and efficient nature which affords good visibility, a wide landing base, elimination of wing hinge bending, no definite stall at high angles of attack and simplification of arrangement of thrust and drive mechanisms. Still another object is to design a convertiplane type of aircraft having a single simplified set of controls for use in directing either vertical or horizontal flight and further having a fuselage portion which is maintained substantially horizontal at all times in flight.

These and other objects and novel features will be apparent from the following detailed description of the invention.

An evaluation of possible ways in which the foregoing objectives might be realized has led to the basically novel concept of combining power-driven rotor blades with a lift wing in such a way as to provide for both propulsion and directional control. In carrying this inventive concept into practice, I have further conceived of at least one practical embodiment in which the lift wing is pivotally mounted or hinged to a fuselage so that the wing may tilt with respect to the fuselage to accomplish vertical take-off as well as movement in a horizontal direction. One simple form of the invention has been illustrated in the accompanying drawings, in which Fig. 1 is a diagrammatic view showing schematically the convertiplane of the invention in various positions starting from a ground position, then rising in a substantially vertical take-off, then levelling off along a horizontal path and finally descending to a landing point;

Fig. 6a is a plan view of the convertiplane of the invention;

It will be understood that the form of the invention illustrated in Figs. 1–9 is intended to be representative of one greatly simplified aircraft construction involving principles of construction and operation capable of being embodied in a wide range of more elaborate and complicated mechanisms which are contemplated to satisfy varying requirements and conditions.

Figure 1:
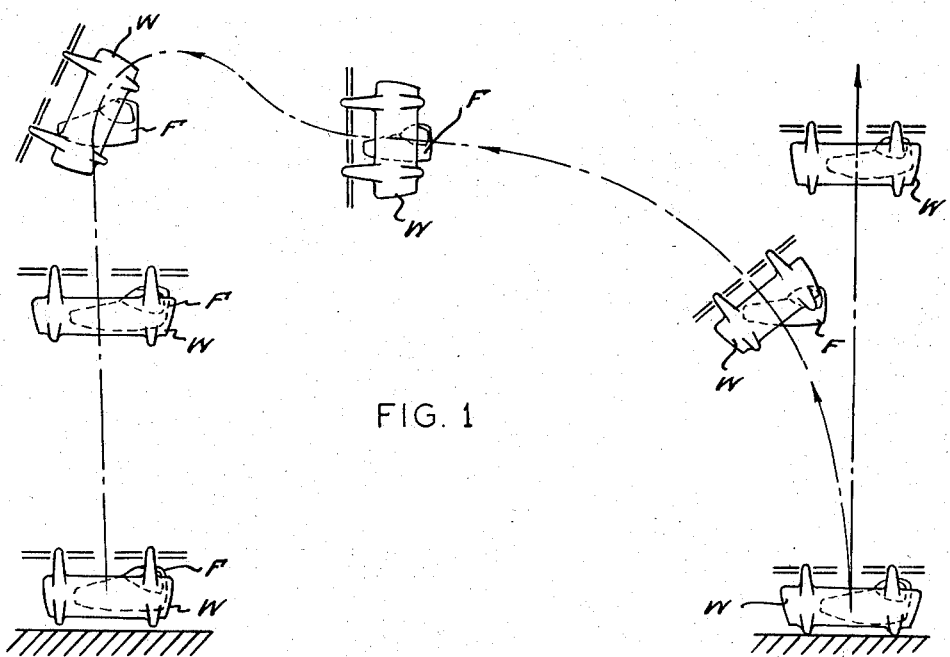
Figure 2:
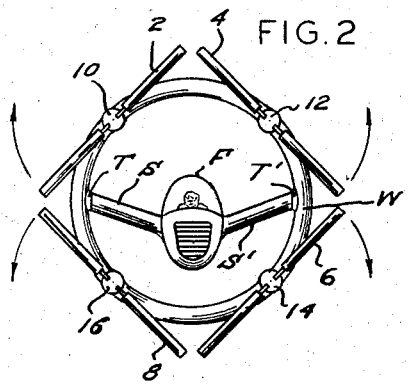
Fig. 2 is a front elevational view of the convertiplane of the invention showing somewhat schematically a fuselage having a lift wing supported thereon in hinged relationship and a plurality of thrust devices located on the lift wing member.

Referring in detail to the simplified form of convertiplane structure shown in Figs. 1–5, inclusive, F denotes a fuselage to which may be rigidly secured, for example, a pair of wing support members S and S' of tubular form. These support members are preferably arranged to project angularly outwardly from either side of the fuselage, as best shown in Fig. 2, and at their outer extremities may pivotally receive trunnions T and T'. Solidly secured to the trunnions by welding, bolts or other means is a lift wing member W which, in one preferred form, is also of hollow construction and comprises a continuous circular body, as is best shown in Fig. 2. It will be understood that the wing may be of various other desired closed shapes.

It will be observed that, by means of the arrangement described, the wing is, in effect, hinged to the fuselage and thus has a single degree of freedom relative to the fuselage. In accordance with the invention, I provide at spaced-apart points along the wing W a plurality of thrust devices consisting, for example, of variable pitch rotor blades as 2, 4, 6 and 8, rotatably mounted on rotor nacelles as 10, 12, 14 and 16.

In a normal landing position of the convertiplane, the wing W may assume an attitude such that its rotor blades extend in a substantially horizontal plane. In this landing position, the convertiplane is designed to rest upon a landing gear which may, for example, consist of pneumatic cushions or pads as 18 and 20 received on the lower ends of extensions of the nacelles 10, 12, 14 and 16.

Figure 3:
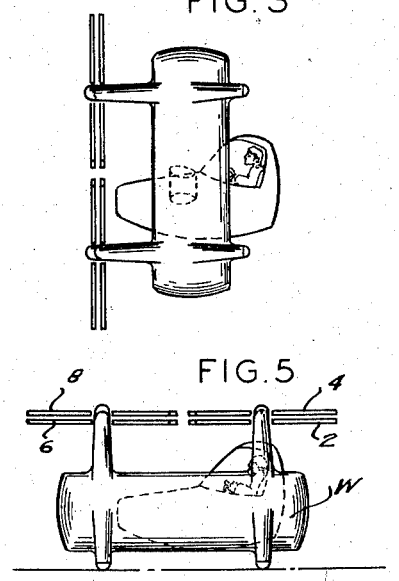
Fig. 3 is a side elevational view illustrating schematically the same general assembly shown in Fig. 2 and particularly indicating the normal horizontally disposed position of the fuselage.
Figures 4, 5:
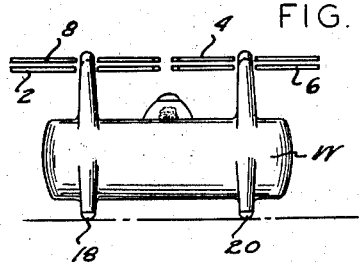
Fig. 4 shows the same convertiplane construction in a landing position viewed from a point directly in front of the fuselage.
Fig. 5 is another view similar to Fig. 4 showing the convertiplane in a landing position but viewed from a point at one side of the fuselage.

I further arrange the fuselage F in relation to the wing W so that, when the convertiplane is in the ground attitude of Figs. 1, 4 and 5, for example, the center of gravity of the fuselage will lie along the central vertical axis of the wing W so that the wing seeks to move from the position of Fig. 3 to the position of Figs. 4 and 5 when allowed to do so and subjected to forces of gravity.

Figure 6:
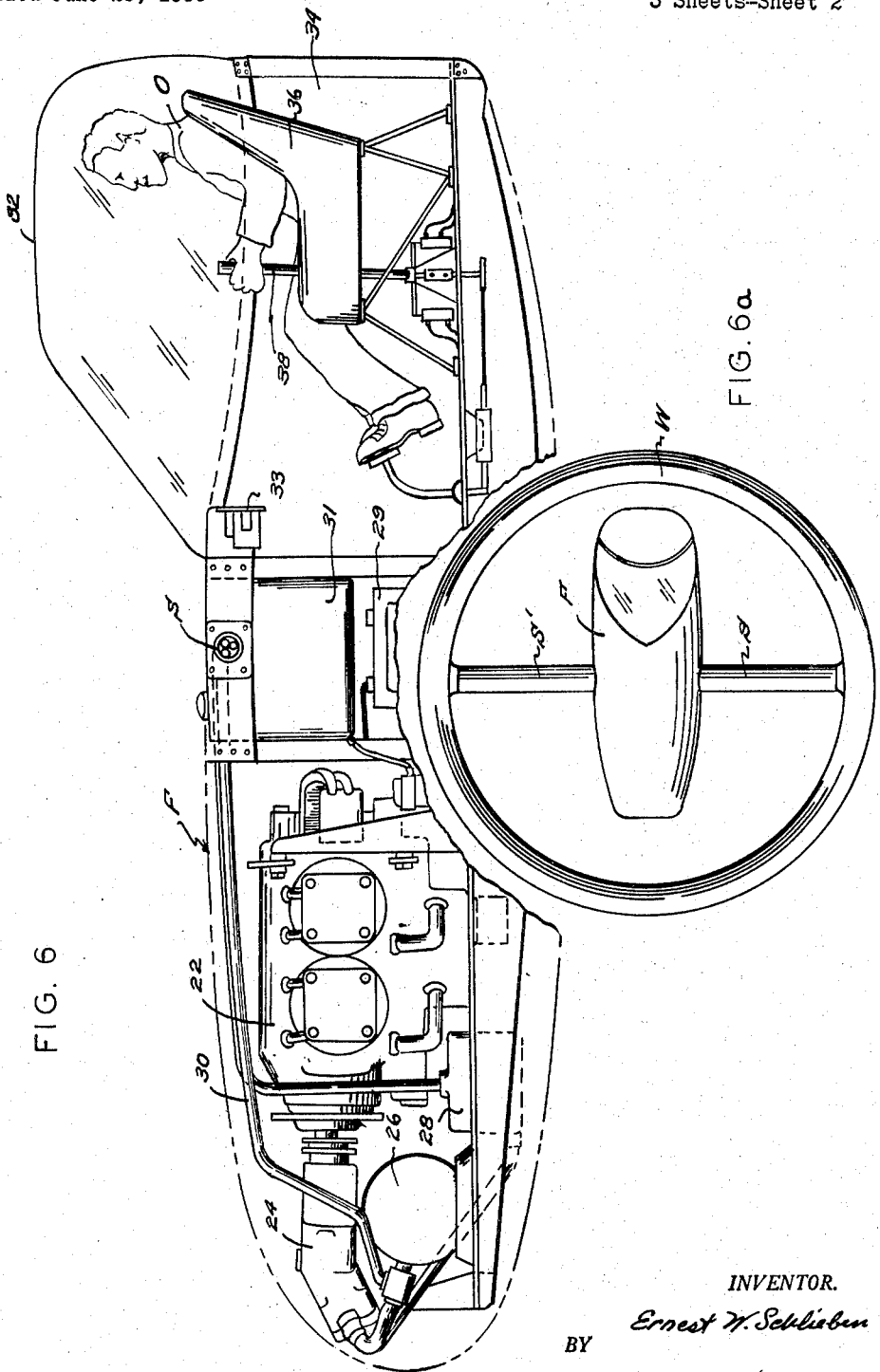
Fig. 6 is a greatly enlarged view of the fuselage showing somewhat in detail power drive means and control mechanism for operating the convertiplane.

The rotor blades 2, 4, 6 and 8 may be of two bladed construction and may be actuated by some suitable power drive such as a motor mounted within the fuselage, as has been shown somewhat more in detail in Fig. 6. In general, the motor furnishes power to each rotor blade through a transmission mechanism which may be hydraulic or of some other desired type. The blades of each rotor are controllable in pitch through a separate hydraulic control mechanism and each rotor blade may be selectively controlled in pitch.

The fuselage F comprises a frame covered by a casing or fairing of some suitable material and includes a canopy 32 which overlies a pilot chamber 34. In this chamber is received a pilot's seat 36 adjacent to which is a control arm 38 through which the operator O manipulates the power driving mechanism of the convertiplane. Operating conditions in the plane are observed from inspection of an instrument panel 33.

Fig. 6 is intended to show the power drive somewhat diagrammatically wherein numeral 22 denotes a motor which actuates a pump 24 connected to a fluid accumulator 26. Numeral 28 refers to a fluid reservoir and conduits as 30 conduct fluid from the pump rearwardly through the fuselage and out through the tubular supports S and S', one of which is shown in Fig. 6. A fuel tank 31 for the motor 22 is located immediately above a battery 29.

The pump operates, through the fluid conduits as 30, individual hydraulic motors for the driving shafts of the several rotor blades 2, 4, and 8. One illustrative pump and driving shaft arrangement has been illustrated in Fig. 8 in which numeral 40 denotes a drive shaft to which is secured a rotor blade as 2 and, on this shaft 40, is a hub 42. Considering one typical pitch control mechanism, numerals 43 and 44 indicate pitch control arms which are operated by pitch control rods 45 and 46. These rods are attached to a slide member 48 on the shaft 40 and the slide includes a bearing member 50 to which is pivotally attached a pivot arm 52 under the control of a pivot arm actuator 54.

Figure 7:
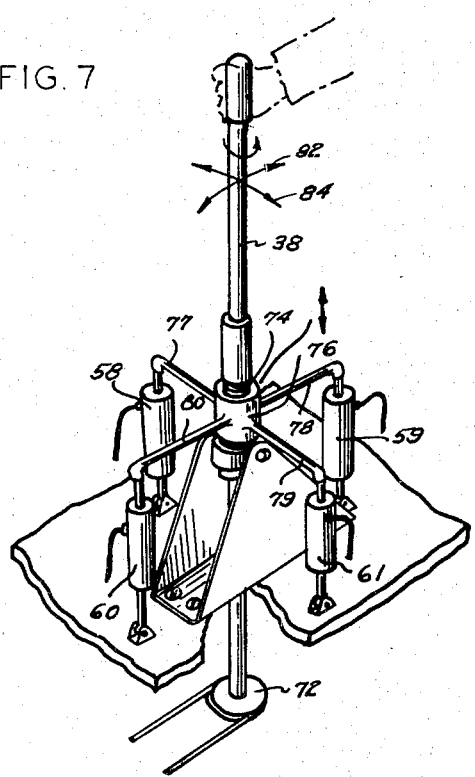
Fig. 7 is a detail perspective view of control mechanism for the power drive employed to propel the convertiplane.

The pivot arm actuator 54 is hydraulically actuated through separate hydraulic conduits 55 and 56 which connect with similar hydraulic conduits provided on each one of a set of actuators 58, 59, 60 and 61 forming part of a control rod mechanism illustrated in Fig. 7.

Figure 8:
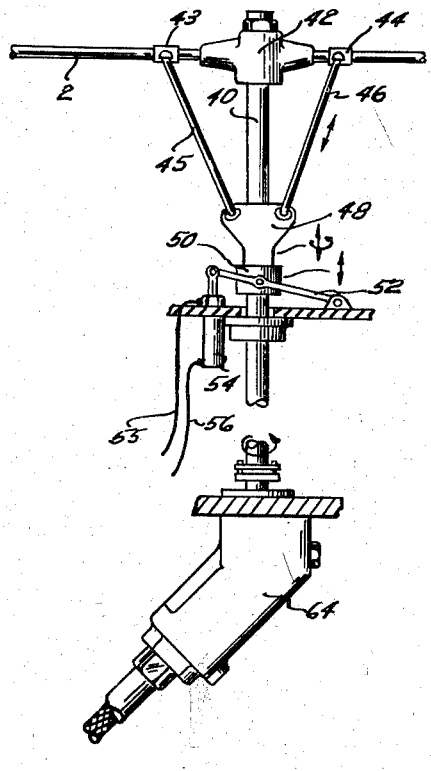
Fig. 8 is another detail view partly in cross-section showing parts of the control mechanism.

A rotor drive motor of some suitable type, such as an hydraulic motor shown in Fig. 8 and denoted by the numeral 64, is driven by the pump 24 and turns the rotor blade shaft 48, as suggested. It will be understood that various other arrangements for driving the rotor shaft will be employed in carrying out the invention.

Figure 9:
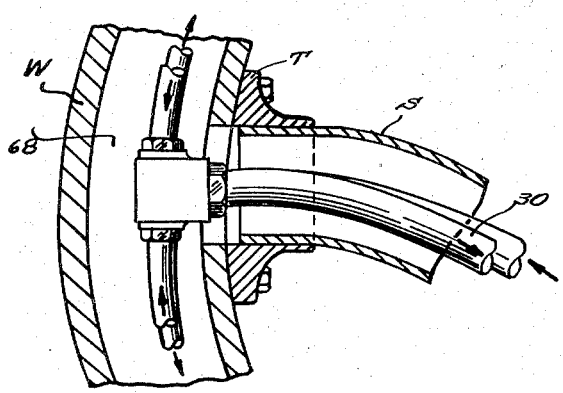
Fig. 9 is a fragmentary detail cross-sectional view of a portion of the lift wing and fluid conduit means mounted therein.

The conduits as 30 may, for example, extend through the support S and into the annular chamber 68 of the wing W, in some such manner as that illustrated in Fig. 9. The motor 64 may also be located internally of the wing. Here also it is intended that the simplified arrangement indicated is set forth for purposes of illustrating one workable form of the invention and it may be desired to employ various other types of driving arrangements.

The control mechanism shown in Fig. 7 may, for example, include with the actuators 58, 59, 60 and 61, already referred to, the vertical control stick 38. This member supports at its lower end a throttle pulley 72 operatively connected with the motor 22 through a suitable pulley. Also, at its intermediate portion, the control stick 38 may be provided with a threaded section 74 which is in threaded engagement with a bearing support 76 which has received thereon in transversely disposed relationhsip arms as 77, 78, 79 and 80. By means of the arrangement described, therefore, it will be appreciated that turning the control stick 38 about a vertical axis operates all of the actuators 58, 59, 60 and 61 at once and simultaneously operates the engine throttle. However, if the operator pushes the control stick in any one of the four directions indicated by the arrows 82 and 84, the actuators 58, 59, 60 and 61 may be differentially operated. As was the case with the rotor blade drive, it is intended that this control stick mechanism may be varied in many respects but is intended to constitute one simple means of carrying into effect the unique arrangement of the invention in its broader aspect.

In operation, assuming the convertiplane is at rest, a sufficient motor speed is attained to drive the rotor blade in the position shown at the lower right-hand side of Fig. 1 with the rotor blade normally rotating in a horizontal plane. The rotors produce thrust which lifts the convertiplane for vertical take-off. As soon as a desired altitude is reached, a transition from vertical to forwardly directed flight is carried out with part of the convertiplane weight being sustained by rotor thrust and part by wing lift. The transition is accomplished by means of differential thrusts by one or more blades, together with the total thrusts of all the rotor blades. Thus, it will be apparent that the rotors serve to provide for lift, for control of forward flight, and for stabilization, since the speed of each motor may be varied over a range of operating speeds and the pitch of each rotor blade may also be selectively varied. During descent of the convertiplane without power, the convertiplane will, in addition, be sustained through lift developed by the autorotating rotors.

The convertiplane is statically unstable in vertical and forward flight, except for rotation around the longitudinal axis of the fuselage in forward flight. Artificial stability is obtained by adjusting the thrust of each rotor to produce stabilizing moments required to obtain a desired attitude of the wing.

It is pointed out that, in the event of power failure during forward flight, the fuselage weight and wing lift will produce a rotational moment on the wing to cause it to rotate and assume a horizontal position. In this horizontal position, the convertiplane is capable of autorotating descent. Thus recovery from power failure and an emergency landing can be accomplished automatically. Nevertheless, the operator may override the pitch control during descent if he wishes to guide the aircraft to land at point of his selection. In addition, the operator may, by a sudden increase in rotor pitch at a point near the ground, achieve a soft landing.

From the foregoing description, it will be evident that I have disclosed a unique aircraft construction of the convertiplane class which is characterized by many advantages. There is realized freedom from vibration, low maintenance, good accessibility for repairs and service, use of packaged components available in the art, low first cost, mechanical operating simplicity, structural simplicity, control simplicity, aerodynamic cleanliness, excellent visibility and natural pilot position.

It is further intended that the invention may be practiced in various forms and modifications within the scope of the appended claims.

Having thus described my invention, what I claim is:

1. A convertiplane construction comprising a wing member comprising a circular body of substantially toric section, means for propelling the wing, and a fuselage mounted in the wing in hinged relationship therewith.

2. A structure according to claim 1 in which the fuselage is mounted on the wing by means of hollow supporting members and said means for propelling the wing includes fluid power drive means located in the fuselage and having fluid conduits received through the hollow supports extending between the fuselage and the wing.

3. A structure according to claim 2 in which said means for propelling the wing further includes variable pitch rotor blades and a mechanism constructed and arranged in the fuselage to control said variable pitch rotor blades.

4. A structure according to claim 3, including a single control device for directing selectively the pitch of the said rotor blades and the speed of said rotor blades.

5. An airplane comprising a ring-shaped wing, a fuselage pivotally supported within said wing between two points thereon, and plural power-driven thrust means secured to said wing to provide propulsion and control of the attitude of said wing and to stabilize said wing.

6. An airplane comprising an airfoil closed upon itself to form a continuous wing of annular shape, a fuselage pivotally supported within said wing, and thrust means secured to said wing and arranged to provide propulsion, stabilization, and control of the attitude of said wing.

7. An airplane comprising a continuous airfoil closed upon itself to form a wing of annular shape, a fuselage pivotally supported within said wing to assume a horizontal position regardless of the attitude of said wing, landing gear secured to one edge of said airfoil, and plural, individually controllable thrust means secured to the other edge of said airfoil arranged to provide propulsion, stabilization, and control of the attitude of said wing.

8. An airplane comprising a ring-shaped wing of substantially toric section, a fuselage pivotally supported within said wing and arranged to assume a horizontal position regardless of the attitude of said wing, and plural thrust means secured to said wing and providing sole control of the attitude and stability of said wing.

9. An airplane comprising a continuous closed wing of substantially toric section, a fuselage pivotally supported within said wing, propelling means including variable pitch rotor blades secured to said wing, drive means for said propelling means mounted in said fuselage, and a mechanism constructed and arranged in the fuselage to control the pitch of said rotor blades.

10. An airplane comprising a continuous closed lift wing of substantially toric section, a fuselage mounted within said wing in hinged relationship therewith, means including rotors with variable pitch blades supported on said wing for propelling the wing, drive means for said rotors mounted in said fuselage, and a mechanism constructed and arranged in the fuselage including a single control device for selectively controlling the speed of said rotors and the pitch of said rotor blades.

11. A convertiplane comprising a short circular-cylindrical wing of substantially toric sections having leading and trailing edges, landing gear secured to the trailing edge of said wing and distributed about its periphery, means secured to the leading edge of said wing for propelling the wing and providing sole control of the attitude and stability of said wing, and a fuselage pivotally supported within said wing and arranged to assume a horizontal position regardless of the attitude of said wing.

12. A convertiplane comprising a lift wing of circular-cylindrical shape and of substantially toric section and having leading and trailing edges, means including rotors with variable pitch blades supported on the leading edge of said wing and arranged whereby said blades are substantially perpendicular to the central axis of said wing, landing gear secured to the trailing edge of said wing, a fuselage mounted within said wing in hinged relationship therewith, drive means for said rotors mounted in said fuselage, and a mechanism constructed and arranged in said fuselage including a control device for selectively controlling the speed of said rotors and the pitch of said rotor blades.

References Cited in the file of this patent

UNITED STATES PATENTS

| 1,427,830 | McCauley | Sept. 5, 1922 |
| 1,827,438 | Rauch | Oct. 13, 1931 |
| 2,382,824 | Solomon | Aug. 14, 1945 |
| 2,549,108 | Martin | Apr. 17, 1951 |

FOREIGN PATENTS

| 1,033,623 | France | Apr. 8, 1953 |